J. TAMBOUR.
AUTOMATIC SAFETY DEVICE FOR SMALL ARMS WITH ONE OR SEVERAL LOCKS.
APPLICATION FILED DEC. 20, 1905.
992,082. Patented May 9, 1911.
5 SHEETS—SHEET 1.
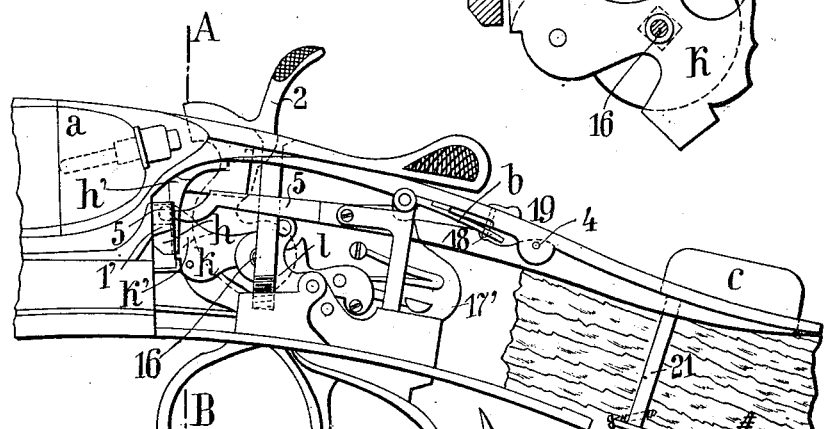
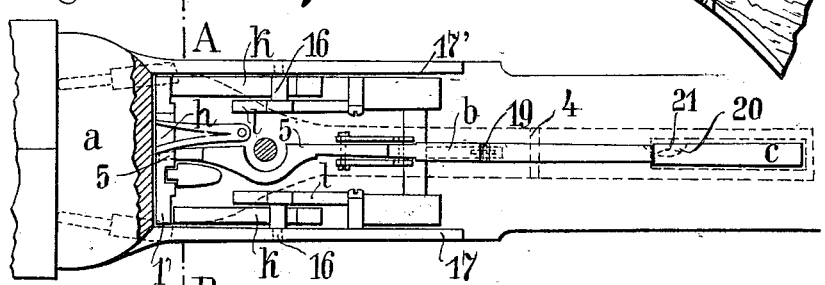
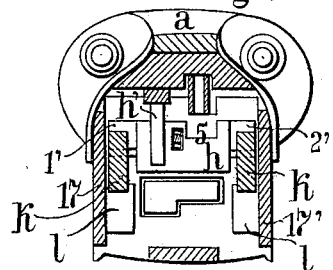
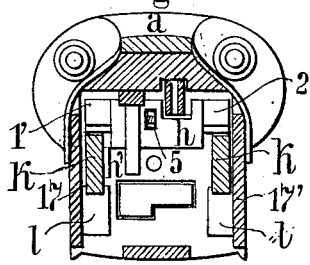
Witnesses:
Inventor
Joseph Tambour
By James L. Norris
Atty J. TAMBOUR.
AUTOMATIC SAFETY DEVICE FOR SMALL ARMS WITH ONE OR SEVERAL LOCKS.
APPLICATION FILED DEC. 20, 1905.

992,082.

Patented May 9, 1911.

5 SHEETS—SHEET 2.

Witnesses:

Inventor
Joseph Tambour
By
James L. Norris
Atty.

THE NORRIS PETERS CO., WASHINGTON, D. C.

J. TAMBOUR.
AUTOMATIC SAFETY DEVICE FOR SMALL ARMS WITH ONE OR SEVERAL LOCKS.
APPLICATION FILED DEC. 20, 1905.

992,082.

Patented May 9, 1911.

5 SHEETS—SHEET 3.

Witnesses:

Inventor
Joseph Tambour
By James L. Norris
Atty

J. TAMBOUR.
AUTOMATIC SAFETY DEVICE FOR SMALL ARMS WITH ONE OR SEVERAL LOCKS.
APPLICATION FILED DEC. 20, 1905.
992,082.
Patented May 9, 1911.
5 SHEETS—SHEET 4.
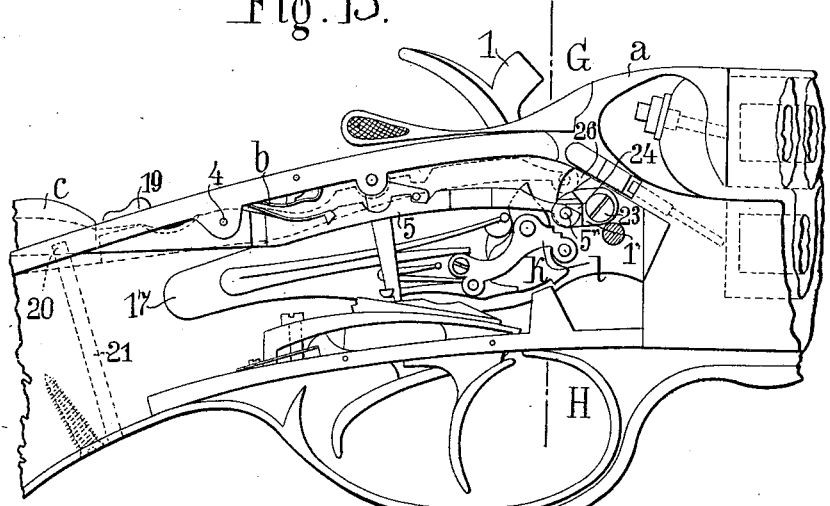
Fig. 15.
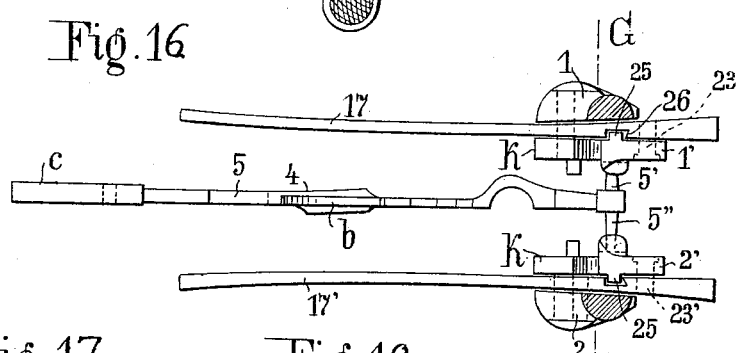
Fig. 16.
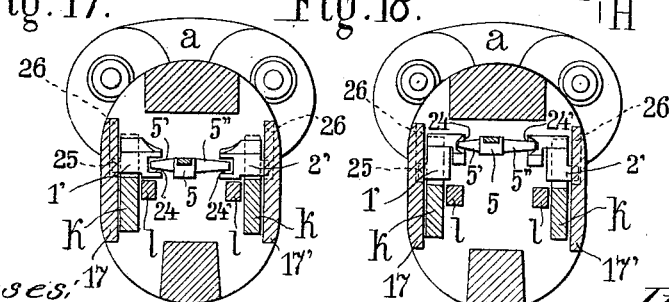
Fig. 17. Fig. 18.
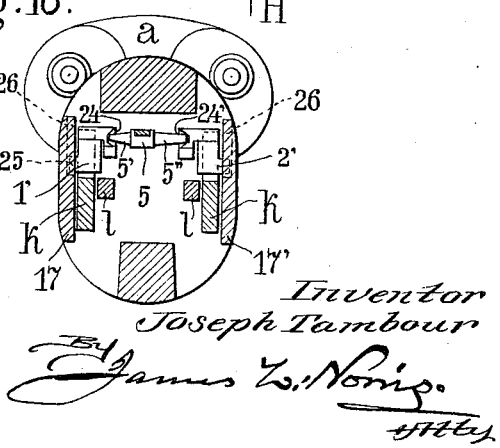
Witnesses:
Inventor
Joseph Tambour J. TAMBOUR.
AUTOMATIC SAFETY DEVICE FOR SMALL ARMS WITH ONE OR SEVERAL LOCKS.
APPLICATION FILED DEC. 20, 1905.

992,082.

Patented May 9, 1911.

5 SHEETS—SHEET 5.

Witnesses:

Inventor
Joseph Tambour

UNITED STATES PATENT OFFICE.

JOSEPH TAMBOUR, OF NANTERRE, NEAR PARIS, FRANCE.

AUTOMATIC SAFETY DEVICE FOR SMALL-ARMS WITH ONE OR SEVERAL LOCKS.

992,082.      Specification of Letters Patent.      Patented May 9, 1911.

Application filed December 20, 1905. Serial No. 292,573.

*To all whom it may concern:*

Be it known that I, JOSEPH TAMBOUR, subject of the Emperor of Austria-Hungary, residing at Nanterre, near Paris, France, have invented certain new and useful Improvements in Automatic Safety Devices for Small-Arms with One or Several Locks, of which the following is a specification.

This invention relates to improvements in safety devices for small arms, in which safety blocks are inserted between the firing pin and hammer, the safety blocks being held in their safety position without spring action in direct coöperation therewith and are shifted or have a predetermined movement imparted thereto in opposite directions by the action of a releasing lever projecting from the stock of the firearm.

The improvements have for their object to so arrange the safety devices that mis-fires are prevented or the trigger cannot be actuated until the firing pin has been completely set free by the safety device, and to arrange the safety device in coöperation with firearms having external hammers so that said safety device will be located within the casing and prevented from being disarranged or obstructed in its operation by the entrance of foreign bodies such as sand, small stones and the like, and also to provide a safety device applicable to guns or firearms with hair-trigger action.

Figure 6:
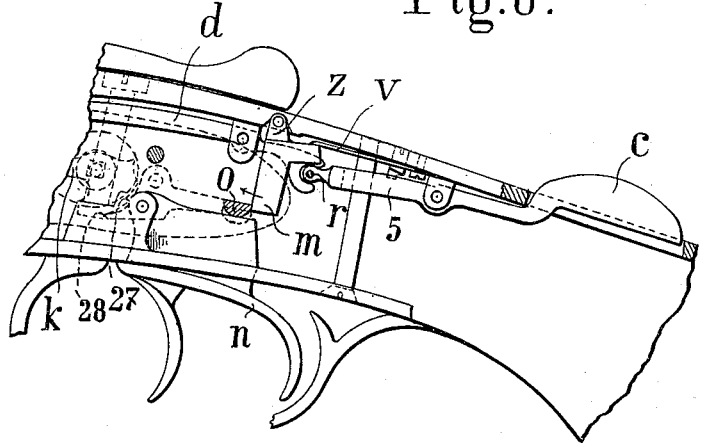
Figure 7:
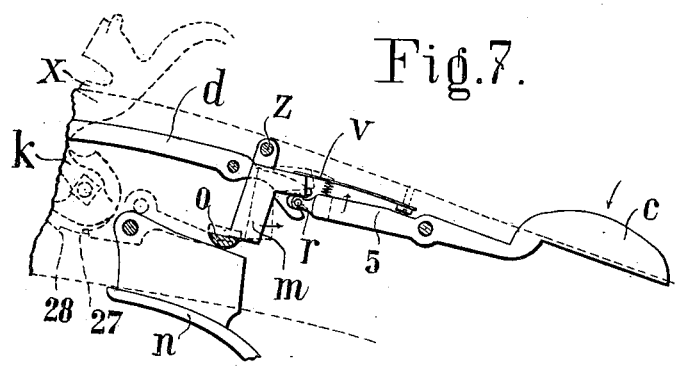
Figure 10:
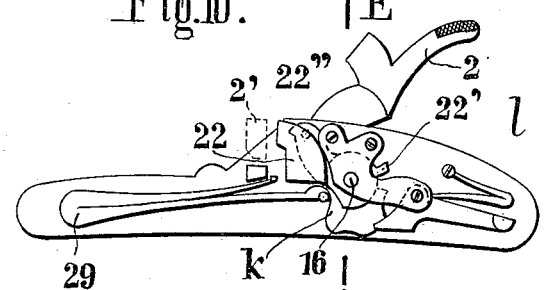
Figure 8:
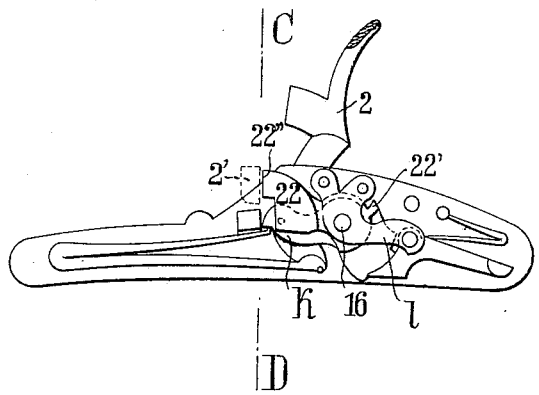
Figure 9:
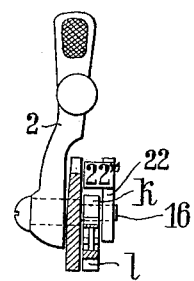
Figure 11:
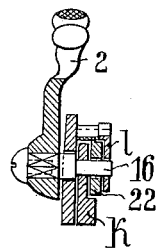
Figures 12, 13:
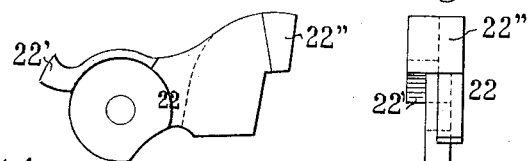
Figure 14:
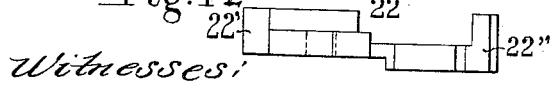
Figure 19:
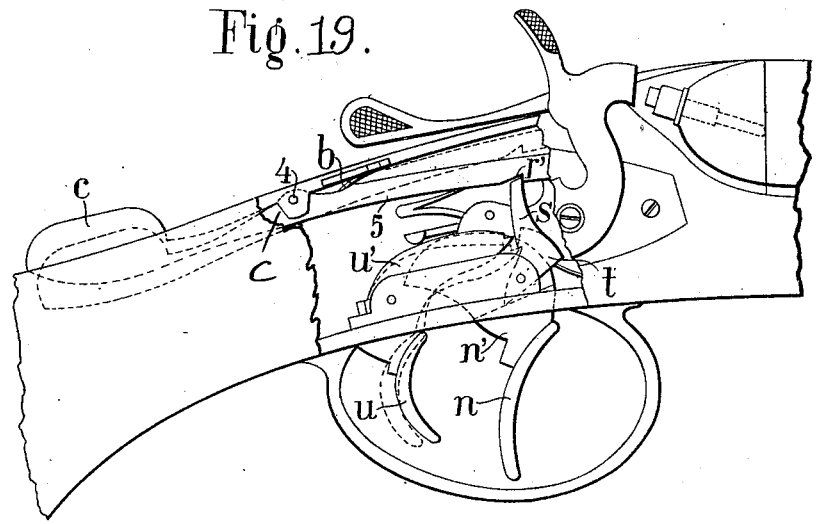
Figure 20:
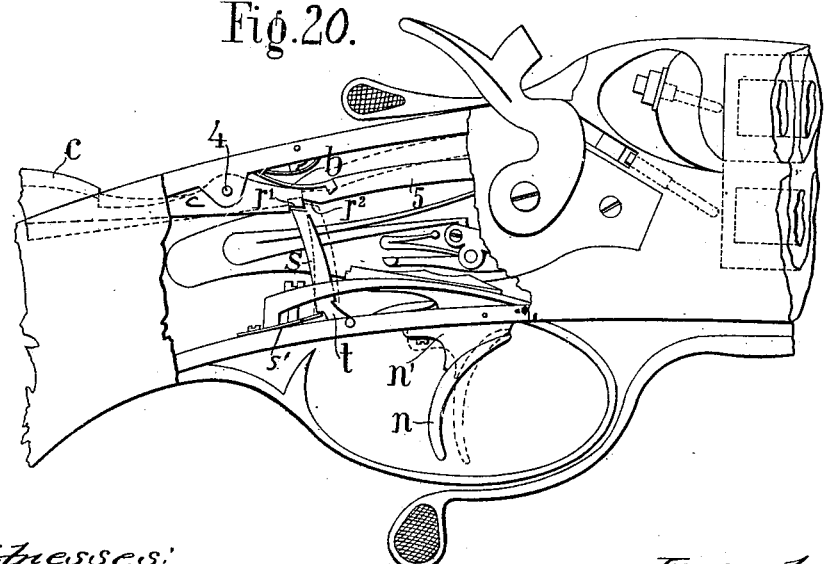

In the accompanying drawings: Figure 1 is a side elevation of a portion of a firearm with a part of the casing removed and embodying the features of the invention. Fig. 2 is a detail view on an enlarged scale showing in elevation and section, parts of the mechanism illustrated by Fig. 1. Fig. 3 is a plan view of the mechanism shown by Fig. 1, a portion of the casing being broken away. Fig. 4 is a transverse vertical section on the line A—B, Fig. 1, showing the mechanism in safety position. Fig. 5 is a view similar to Fig. 4 and taken on the same line of section showing the mechanism released. Figs. 6 and 7 illustrate in side elevation firing mechanism in two positions and embodying a modification of the structure, Fig. 6 showing the hammer down, and Fig. 7 showing the hammer cocked. Fig. 8 represents in side elevation the improved mechanism arranged for adaptation to firearms with comparatively low locks, the hammer being illustrated in half-cocked position. Fig. 9 is a transverse vertical section taken on the line C—D, Fig. 8. Fig. 10 is a view similar to Fig. 8 showing the hammer cocked. Fig. 11 is a transverse vertical section taken on the line E—F, Fig. 10. Figs. 12, 13 and 14 show detail views of the parts of the mechanism as illustrated by Figs. 8, 9, 10 and 11. Fig. 15 represents a side elevation of a portion of a tripple barrel gun and lock mechanism therefor and embodying two locks with the automatic safety device applied thereto, the right-hand lock being removed. Fig. 16 is a plan view, partially in section, of operative parts embodied in the mechanism shown by Fig. 15. Fig. 17 is a transverse vertical section on the line G—H, Fig. 15, and showing the mechanism in safety position. Fig. 18 is a view similar to Fig. 17 showing the mechanism in free or released position. Fig. 19 is a side elevation of a portion of a gun broken away to show the lock which embodies a double hair-trigger and illustrating the safety device applied thereto. Fig. 20 is a side elevation of a portion of a gun broken away to expose the lock embodying a single hair-trigger and illustrating the safety device applied thereto.

As shown by Figs. 1 to 5, inclusive, the construction of the safety device is such as to adapt the same to a double barrel gun with external hammers. A slide $h$ is mounted to vertically move on the back wall of the breech casing $a$ and engages a guide or piece $h'$, and carried by the said slide are safety blocks $1'$ and $2'$ to coöperate with the hammers, one of the hammers being shown by Fig. 1 and designated by the numeral 2. The safety blocks $1'$ and $2'$ extend upwardly on opposite sides, as shown by Figs. 4 and 5, and are located adjacent to the lock plates 17 and $17'$ and are disposed when in safety position in front of the extensions $k'$ of stop levers $k$, see Figs. 1 to 4, so that the hammers if accidentally thrown forward cannot reach the firing pins, as shown at Fig. 1. A releasing lever $c$ also coöperates with this mechanism and has a rear engaging terminal $c'$ projecting through the stock of the firearm. This releasing lever $c$ extends forwardly and has a front arm 5 directly engaging the slide $h$, the said releasing lever being fulcrumed as at 4. Coöperating with this releasing lever $c$ is a spring $b$ acting to restore the lever and slide to normal position when the lever is released, and the resetting of this releasing lever by the spring $b$ and the actuation of the slide by said lever dispenses with the necessity of having any spring-actuated devices directly engaging the said slide $h$ or the safety blocks 1' and 2'. When the lever $c$ is pressed inwardly at its rear extremity through the engaging terminal $c'$ the arm 5 of said lever and slide $h$ are elevated and the safety blocks 1' and 2' are simultaneously elevated to release the hammers or to permit the latter to have sufficient forward throw to strike the firing pins. If the pressure on the lever $c$ is withdrawn or the said lever released, the parts of the safety device as a whole are instantly brought back into safety position by means of the spring $b$ acting on the releasing lever $c$ and the safety blocks 1' and 2' will then be positioned in front of the extensions $k'$ of the stop levers $k$ coöperating with the hammers and the latter will then be prevented from moving far enough forward to strike or reach the firing pins.

To prevent firing of the gun by persons unacquainted with the operation and thus avoid accidents from careless handling of a firearm, there is combined with the safety mechanism just explained a catch 19 manually operative from the exterior of the stock and arranged to engage a notch 18 of the releasing lever $c$ and as a further precaution the lever $c$ near its rear extremity is formed with a side notch 20 for engagement therewith of a secret catch 21 having a suitable screw-head, as clearly shown by Figs. 1, 3 and 15.

In the modification of the construction as shown by Figs. 6 and 7 the locking device for the trigger consists of an elbow lever $m$ pivotally mounted at $z$ to the top of the lock casing and having a spring $v$ engaging a portion of the same, the portion of the elbow lever engaged by the spring consisting of a rearwardly projecting arm $m'$. The lower arm of the lever $m$ when in locking position bears directly upon the device to be locked, for instance as shown, the sear $o$ coöperating with the trigger $n$ and the upper arm $m'$ acts on the forward extremity of the arm 5 of the releasing lever $c$. The lower arm of the elbow lever might, without any departure from the invention, directly engage the trigger $n$, and the upper arm $m'$ of the said elbow lever by preference contacts with a laterally projecting pin $r$ at the forward end of the arm 5 of the releasing lever. Interposed between the safety block slide $h$ and the arm 5 of the releasing lever $c$ in this instance is an intermediate lever $d$ fulcrumed as at $d'$ and engaging at its forward extremity with the said slide $h$ and having a bifurcation $d^2$ at its rear end into which the forward end of the arm 5 of the releasing lever $c$ operatively projects. When the lever $c$ is pressed into the stock against the resistance of the spring $v$ the slide $h$ and the block 1', for instance, are operated to lower the said block through the intermediate action of the lever $d$, it being understood that in this instance the same slide $h$ and safety block construction will be used as in Figs. 1 to 5, inclusive, though not shown in the modification as illustrated by Figs. 6 and 7. It will also be understood that this safety mechanism may be applied to guns with two or more locks and in this event an elbow lever $m$ will be associated with each sear $o$ and a single releasing lever will act upon all the elbow levers.

As shown by Fig. 6, the hammer is at half-cock and the elbow lever $m$ has its lower arm against the sear $o$, that is, the said lever is in that position into which it has been brought when the releasing lever $c$ is liberated to return to normal position, and when the parts are so arranged any forward motion of the hammer is prevented, the stop lever $k$ being also used in this construction and partially shown by Figs. 6 and 7. When the hammer is cocked, the beak of the sear $o$ engages with the cocking notch 27 of the hammer which notch is for this purpose disposed lower relatively to the hammer pivot than the half-cock notch 28 and whereby the tail of the sear is lowered to such an extent that the elbow lever $m$ is free to turn or shift into the locking position shown by Fig. 7. Therefore, it will be understood from the foregoing that for the purpose of preventing misfires, the release of the sear takes place only when the safety block has been completely withdrawn.

In applying the safety mechanism embodying the features of the present invention to small firearms with comparatively low locks and consequently with very flat casings, see Figs. 8 to 14, it is necessary to slightly modify the stop lever construction, hereinbefore explained, in view of the fact that the extension on the latter as illustrated in the foregoing figures would project beyond the casing, or provision would have to be made for such projection when the hammer was cocked and the intention and desirability of inclosing the safety mechanism within the casing could not be fulfilled.

To adapt the mechanism to the form of lock just explained the stop lever is formed without the extension $k'$ and on the spindle 16 of the hammer adjacent to the said stop lever an auxiliary lever 22, of the form shown by Figs. 12, 13 and 14, is applied and provided with a rear projection 22' and a lateral offset or abutment 22'' at its forward extremity for coöperation with the adjacent safety block which, as shown, is designated by the numeral 2'. This auxiliary lever performs the function of the extension $k'$ of the stop lever $k$, as hereinbefore explained, and by contact of the abutment 22'' against the safety block 2' a full forward throw of the hammer is prevented and the said hammer, together with the firing pin coöperating therewith, is retained in safety position in the same manner as hereinbefore explained.

The hammer 2 and the stop lever $k$ are fixedly arranged upon the spindle 16 so that when the hammer 2 is cocked the stop lever $k$ will be given the same angular motion or be moved correspondingly with the movement of the hammer. As the lever $k$ is connected to the longer arm of the main spring 29, the latter will be moved to the position shown by Fig. 10 or be elevated and disposed in corresponding cocked position.

The auxiliary lever 22 is so shaped, see Figs. 8 and 10, that after the cocking operation has been partly performed the end of the longer arm of the spring 29 will abut against the under side of the auxiliary lever 22 and rotate the latter lever, which is loosely pivoted on the spindle 16, until the rear surface of its abutment $22''$ bears against the bracket $l$, as shown by Fig. 10. The auxiliary lever 22 thus follows the rotation of the stop lever $k$ only to a certain extent and therefore remains covered within the interior of the weapon. The bracket $l$ and the stop lever $k$, in order to compensate for the movement of the lateral projection or abutment $22''$ of the auxiliary lever, will be shaped at their front portions to give a clearance to said abutment, suitable arc-shaped recesses being preferably provided for this purpose. The safety blocks in this construction, in order to free the firing pins, will be arranged to move downwardly.

In applying the safety mechanism to the locks of small arms with triple barrels having only two locks, it is not possible to arrange the safety blocks, or the slide carrying the same directly on the rear wall of the breech casing without interfering with the mechanism of the gun, and as shown by Figs. 15 to 18 triple barrel guns are illustrated and have the improved safety mechanism embodying precisely the same principle as in the devices hereinbefore explained applied thereto. In this instance, the safety blocks $1'$ and $2'$ are mounted on the lock plates 17 and $17'$ by means of pivot pins 23, $23'$ and are moved upwardly after release of the lock by means of transverse pins $5'$, $5''$ on the releasing arm 5 of the releasing lever $c$, the said pins $5'$, $5''$ engaging grooves 24, $24'$ in the blocks so that the extensions $k'$ of the stop levers $k$ are free to pass below the blocks on the forward throw of the hammers. The blocks are guided on the lock plates by means of studs 25 engaging grooves 26 formed in the said plates and as clearly shown by Figs. 16, 17 and 18. In this instance also the catch 19 and the secret catch 21, hereinbefore explained, are used to guard against improper manipulation and accidents particularly when the firearm is handled by persons unacquainted with its operation. In this modification of the construction or particular application of the safety devices or mechanism for a hammer and firing pin is combined the trigger catch described with reference to Figs. 6 and 7.

In applying the invention to guns with hair-trigger action, Figs. 19 and 20, the firing mechanism is locked both with the engaged and the disengaged hair-trigger by arranging in combination with the hair-trigger mechanism an upwardly directed abutment or locking lever which, in the safety position in which the lock is always secured when not firing, engages with a notch in the releasing lever, the latter having a projection at its rear terminal extending through the stock and pressed inwardly when grasping the stock for firing, as is well known, so that the trigger can only be actuated at that moment. The releasing lever $c$ is similar to that heretofore described and well known in the art and is provided with a rear terminal projection $c'$ extending through the stock, said lever being fulcrumed as at 4 and having a spring $b$ engaging the same in a manner similar to the arrangement shown by Figs. 1 to 5, both inclusive. This spring $b$ normally holds the front arm 5 of the lever $c$ in safety position. In the under side of the lever $c$ notches $r'$ and $r^2$ are formed for the reception of the upper end of an upwardly projecting abutment lever $s$ which, as shown, is in the form of an upwardly directed arm from a notch-piece $t$, and in double trigger constructions, as shown by Fig. 20, is arranged in rear of the trigger body $n'$ and the hair-trigger body $u'$, while in the single hair-trigger construction this abutment lever is arranged in the rear of the trigger, as shown by Fig. 20.

In the construction shown by Fig. 19 the arm 5 of the lever $c$ has only one notch $r'$ formed in the under side thereof and in the construction shown by Fig. 20 two notches $r'$ and $r^2$ are shown in said lever arm. When the hair-trigger is disengaged, as shown in full lines, Fig. 19, the abutment lever $s$ is engaged in the notch $r'$ of the arm 5 of the lever $c$. In guns having double triggers the abutment lever $s$ remains engaged with the notch $r'$ when the hair-trigger is engaged.

For engaging the hair-trigger body $u'$ which is operated by pressure on the hair-trigger $u$, Fig. 19, the releasing lever $c$ having the arm or extension 5 and provided with a single notch $r'$ must first be shifted upward in order that the notch-piece $t$ may be unobstructed in moving forwardly. For this purpose no special manual motion is necessary, as on grasping the stock of the gun for firing the shifting of the releasing lever is effected automatically, as hereinbefore explained. In guns having a single hair-trigger action in which the engagement of the hair-trigger is effected by a forward motion of the trigger $n$, see Fig. 20, the abutment lever $s$ slides into the front notch $r^2$ of the releasing lever when the notch-piece $t$ carrying said abutment lever is moved and free to act through the spring $s'$ engaging the notch-piece. The firing mechanism is locked in both cases and the gun is effectually secured against accidental discharge by pressure unintentionally applied on the trigger. When, on grasping the stock of the gun for firing the rear projecting terminal or pressure piece $c'$ is depressed into the stock, the front portion or arm 5 of the lever $c$ is thrown upwardly and the notch $r'$ or $r^2$ frees the abutment lever $s$ and consequently the trigger device and the gun is ready for firing, all of which is shown by dotted lines, Fig. 20. When the pressure on the lever $c$ is withdrawn or released the several coacting parts are at once brought back into safety position by the spring $b$ acting on the lever $c$ and in which safety position the abutment lever $s$ engages with the notch $r'$. The safety blocks are not shown in connection with this particular mechanism, but will be the same as those heretofore described and actuated through a slide engaged by the forward extremity of the lever $c$ or by the arm 5.

Wherever the parts are hereinbefore specifically described as to their mounting, such for instance as the use of the brackets $l$ forming bearing means for the inner terminals of the hammer spindles, it will be understood that such specific embodiment is only intended to be considered one practical means of arriving at the result sought, and, furthermore, the same mechanism and principle of operation may be utilized in connection with a single hammer and the invention is not limited in its application to any specific number of hammers. It will also be understood that changes in the proportions and dimensions of the several parts may be resorted to to adapt the application of the improved mechanism to locks having varying dimensions.

What is claimed is:

1. The combination of a hammer and trigger mechanism, a spindle on which the hammer is mounted, safety mechanism inclosed within the interior of the firearm and consisting of safety blocks provided with actuating means, means disposed on the hammer spindle coöperating with the blocks, the latter being disposed and movable in advance of the said means, a trigger locking means, and a releasing lever for controlling the trigger locking means, the said releasing lever being so arranged that it releases the trigger mechanism only when the safety blocks are completely moved out of the path of the firing mechanism.

2. The combination of hammer and trigger mechanism, the trigger mechanism including a trigger and, sear, safety blocks, a stop lever, an elbow lever having a rotatable movement and provided with a lower extremity projecting over the trigger mechanism, and a releasing lever upon which the upper end of the elbow lever has bearing, the said releasing lever engaging the safety blocks.

3. The combination of hammer and trigger mechanism, the trigger mechanism including a trigger and sear, safety blocks, a stop lever, a rotatable elbow lever having its lower end projecting over the trigger mechanism, the hammer having a cocking notch and a half-cock notch, the cocking notch being lower than the half-cock notch, the sear during the cocking of the hammer being lowered and permitting the elbow lever to assume its locking position, and a releasing lever with which the upper end of the elbow lever coöperates, the releasing lever also engaging the safety blocks.

4. The combination of hammer and trigger mechanism, a spindle on which the hammer is mounted, safety mechanism inclosed within the interior of the firearm, the said safety mechanism consisting of a stop lever provided with an extension, the stop lever being rotatable with the hammer, safety blocks provided with actuating means and engaged by the extension of the stop lever, a trigger locking means, and a releasing lever for actuating the trigger locking means.

5. In a firearm, the combination of hammer and trigger mechanism, a spindle on which the hammer is mounted, safety mechanism inclosed within the fire arm and consisting of a stop lever having an extension, lock plates, safety blocks movably mounted on the lock plates, a trigger locking means, and a releasing lever controlling the trigger locking means and provided with transverse pins, the releasing lever engaging the safety blocks and guiding the latter in such manner that the extension of the stop lever can pass beneath the blocks on the forward stroke of the hammer.

In testimony whereof I have hereunto set my hand in presence of two subscribing witnesses.

JOSEPH TAMBOUR.

Witnesses:
 JOSEF RUBARCH,
 ALVESTO S. HOGUE.